Patented Dec. 26, 1939

2,185,007

UNITED STATES PATENT OFFICE 2,185,007

PROCESS FOR PRODUCTION OF DIALKYL-BENZENOID SULPHIDES

Bruno H. Wojcik, Niagara Falls, N. Y., assignor to Hooker Electrochemical Company, New York, N. Y., a corporation of New York No Drawing. Application November 23, 1936, Serial No. 112,441

8 Claims. (Cl. 260—608)

By the term "di-benzenoid alkyl sulphides" I wish to be understood as including all those compounds of the class in which two alkylbenzene or alkylbenzenoid ring structures are linked together through their side chain alkyl groups by one or more sulphur atoms. Examples of such compounds are di-phenyl methyl mono- or poly-sulphide, di-naphthyl methyl mono- or poly-sulphide, di-anthracyl methyl mono- or poly-sulphide, etc.

For purpose of illustration I will describe my process as applied to the production of di-phenyl methyl disulphide, commonly known to the art as dibenzyl disulphide. This compound is produced by reaction of phenyl methyl chloride, commonly known as benzyl chloride, made by chlorinating toluene or methyl benzene in the methyl group, with sodium polysulphide, according to the following reaction:

As sodium polysulphide is water-soluble and benzyl chloride is insoluble in water but soluble in alcohol, it has heretofore been customary to react these two compounds in an aqueous medium containing alcohol, and preferably ethyl alcohol. The alcohol solution of benzyl chloride is miscible with the water solution of sodium polysulphide. In this way both compounds are brought into liquid phase and intimate contact. The product is a crystalline substance, melting at 71° to 72° C., and insoluble in water.

This process is open to the objection that, since the resulting product is slightly soluble in alcohol at ordinary temperatures, when using this process it is necessary to distill off alcohol from the product. This results in a loss of alcohol and also a reduction in yield of the product.

I have discovered that the above reaction can be carried out, with a higher yield, by means of mechanical mixing, in the absence of alcohol or any other solvent for the benzyl chloride, and that the resulting product has improved characteristics as compared with those of the product made in accordance with the prior art. For this purpose the sodium sulphide, together with sulphur in the right proportion to form with it sodium disulphide (if the product is to be the disulphide), is first dissolved in water. The water is preferably at boiling temperature, in which case the solution is subsequently cooled to about 75° C. The benzyl chloride is then added. Being lighter than the polysulphide solution, it tends to form a separate liquid layer above the solution. The benzyl chloride is therefore preferably added gradually, the two liquids being vigorously agitated to bring them into intimate contact. The reaction being exothermic, the temperature of reaction, if desired, may be controlled by the rate at which the benzyl chloride is added. The preferred temperature of reaction is 75° to 80° C. The reaction is more vigorous if carried out at a temperature of 100° to 110° C., but in that case it is necessary to provide a reflux condenser; also, the resulting product is found to have a chocolate color, whereas the product made at 75° to 80° C. is relatively colorless. When the reaction is substantially complete, the products and liquid medium are allowed to cool, whereupon the dibenzyl disulphide crystallizes out. It may then be readily separated from the aqueous medium containing in solution the sodium chloride produced by the reaction.

The reaction may be carried out in an iron reactor at 75° to 80° C. or thereabouts. Under these conditions the product is darkened by iron sulphide which, however, is found to be in suspension and may be readily filtered out. Reactors of glass or enamel are impracticable for the purpose, as the sodium polysulphide possesses sufficient alkalinity to attack silica.

The alkalinity of the sodium polysulphide results in the production of a small excess of benzyl alcohol ($C_6H_5$—$CH_2OH$), which forms a persistent wetting film between the crystals of dibenzyl disulphide. Due to the presence of this benzyl alcohol the melting point of my product is reduced to approximately 65° C. For certain purposes the presence of this benzyl alcohol is of distinct advantage. For example, dibenzyl disulphide, when added to mineral lubricating oils, is found to increase the film strength or load carrying capacity of the oil; but the solubility of dibenzyl disulphide of high purity in lubricating oil is limited. I find, however, that the benzyl alcohol in my product gives it increased solubility in such oils at any given temperature and likewise lowers the temperature at which a given proportion of dibenzyl disulphide will remain in solution in a given oil. This is advantageous, even when the dibenzyl disulphide to be added is within the limit of solubility of the dibenzyl disulphide of the prior art, since it greatly facilitates the operation of incorporating this material with the oil. The increased solubility of my product in lubricating oil, due to the benzyl alcohol, is therefore a valuable characteristic.

I find that the yield of dibenzyl disulphide is affected by the degree of concentration of the reagents in the reaction medium. Thus at relatively low concentrations the proportion of benzyl alcohol formed is greater and the yield of dibenzyl disulphide correspondingly less. The preferred concentrations of the several reagents in the reaction mixture are approximately 7.5 parts of sodium sulphide, 3 parts of sulphur and 16.5 parts of benzyl chloride respectively, to 73 parts of water, by weight. It should be noted that these proportions provide a substantial excess of sodium disulphide relative to benzyl chloride, over the one-molecule-to-two proportion called for by the fundamental reaction of the process. This excess is one of the reasons for the high yield which I obtain. With these concentrations my process yields an average of over 95 percent of the theoretical yield of dibenzyl disulphide.

If, in place of sodium polysulphide, sodium monosulphide be used, without the excess sulphur, the product produced by my process, carried out as above described, is dibenzyl monosulphide.

My process is also applicable to reaction with sodium monosulphide or polysulphide of alkylbenzenoid hydrocarbons of the type illustrated by methylnaphthalene, methylanthracene, etc., if chlorinated in the methyl group. In this case the products are di-naphthyl methyl or di-anthracyl methyl mono- or polysulphide.

Obviously, bromine or iodine could be used in place of chlorine to bring about the reaction, but chlorine, being much cheaper, is preferred. Likewise, potassium sulphide or polysulphide could be used in place of sodium sulphide or polysulphide, but sodium is preferred on account of cheapness.

I am aware that it has been proposed to react sodium monosulphide with sulphuric acid and the resulting sodium hydrosulphide with benzyl chloride, in the presence of the sodium sulphate formed at the same time, to produce benzyl mercaptan, and that this reaction is said to result in the production of a minor proportion of di-benzyl monosulphide. The sodium monosulphide remaining, if any, is in an acidic solution with sodium hydrosulphide and sodium sulphate, whereas for high yield of di-benzyl monosulphide for a given consumption of benzyl chloride the sodium monosulphide solution should be alkaline, as it is in my process. The benzyl chloride remaining after the principal reaction, if any, reacts with the sodium monosulphide under acidic conditions and in presence of sodium hydrosulphide, sodium sulphate and benzyl mercaptan. The yield of di-benzyl monosulphide, if any, under these conditions would be of no commercial importance.

I am also aware that it has been proposed to react sodium polysulphide with benzyl chloride in a water immiscible solvent, which is used to extract the product from the aqueous phase; also that this solvent may be added toward the end of the reaction, in which case the reaction is carried on at the boiling temperature of the mixture, which is 102° C. In any case a solvent is used to extract the product and the product is crystallized out of the solvent, which retains some of the product, and the product must therefore be repeatedly crystallized or else the solvent must be recycled. My process, on the other hand, is carried on without the use of a solvent, either during or at the conclusion of the reaction. It is moreover not carried on at boiling temperature when no solvent is used, but at 75° to 80° C. Since the product is immiscible with and insoluble in the aqueous phase, I take advantage of this fact in recovering the product, thus dispensing with the use of a solvent for the product hitherto thought to be necessary, and not only simplifying the process but avoiding the otherwise inevitable losses of the volatile solvent and the expense incident thereto and to recycling it.

I claim as my invention:

1. The process for production of di-benzenoid alkyl compounds in which two alkyl benzenoid groups are joined through their alkyl groups by at least one sulphur atom which comprises adding a benzenoid alkyl halide to an aqueous solution of a compound of an alkali metal with sulphur having at least one sulphur atom per molecule, with agitation, in the absence of any mutual solvent for the reagents, the rate of such addition being regulated to maintain a reacting temperature but not to cause boiling, allowing the resulting mixture to cool and the product to solidify and mechanically separating the product from the aqueous medium containing the by-product, in the absence of any solvent for the product.

2. The process for production of di-benzyl compounds in which two methyl phenyl groups are joined through their methyl groups by at least one sulphur atom which comprises reacting benzyl chloride with a compound of sodium with sulphur having at least one sulphur atom per molecule in an aqueous solution, with the aid of mechanical agitation, at not less than 75° C. but below the boiling point of the mixture, in the absence of any mutual solvent for the reagents, allowing the resulting mixture to cool and the product to solidify and mechanically separating the product from the aqueous medium containing the by-product, in the absence of any solvent for the product.

3. The process for production of di-benzyl compounds in which two methyl phenyl groups are joined through their methyl groups by at least one sulphur atom which comprises reacting benzyl chloride with a compound of sodium with sulphur having at least one sulphur atom per molecule in an aqueous solution, with the aid of mechanical agitation, at substantially 75° to 80° C., in the absence of any mutual solvent for the reagents, allowing the resulting mixture to cool and the product to solidify and mechanically separating the product from the aqueous medium containing the by-product, in the absence of any solvent for the product.

4. The process for production of di-benzyl disulphide containing a small proportion of benzyl alcohol which comprises agitating together substantially 73 parts water, 7½ parts sodium sulphide, 3 parts sulphur and 16½ parts benzyl chloride by weight, in the absence of any mutual solvent for the reagents, at substantially 75° to 80° C., allowing the resulting mixture to cool and the product to solidify and mechanically separating the product from the aqueous medium containing the by-product, in the absence of any solvent for the product.

5. The process for production of di-benzenoid alkyl compounds in which two alkyl benzenoid groups are joined through their alkyl groups by at least one sulphur atom which comprises adding a benzenoid alkyl halide to an aqueous solution of a compound of an alkali metal with sulphur having at least one sulphur atom per molecule, with agitation, in the absence of any mutual solvent for the reagents, the rate of such addition being regulated to maintain a reacting temperature but not to cause boiling, allowing the resulting mixture to cool and the product to solidify and separating the product from the aqueous medium containing the by-product.

6. The process for production of di-benzyl compounds in which two methyl phenyl groups are joined through their methyl groups by at least one sulphur atom which comprises reacting benzyl chloride with a compound of sodium with sulphur having at least one sulphur atom per molecule in an aqueous solution, with the aid of mechanical agitation, at not less than 75° C. but below the boiling point of the mixture, in the absence of any mutual solvent for the reagents, allowing the resulting mixture to cool and the product to solidify and separating the product from the aqueous medium containing the by-product.

7. The process for production of di-benzyl compounds in which two methyl phenyl groups are joined through their methyl groups by at least one sulphur atom which comprises reacting benzyl chloride with a compound of sodium with sulphur having at least one sulphur atom per molecule in an aqueous solution, with the aid of mechanical agitation, at substantially 75° to 80° C., in the absence of any mutual solvent for the reagents, allowing the resulting mixture to cool and the product to solidify and separating the product from the aqueous medium containing the by-product.

8. The process for production of di-benzyl di-sulphide containing a small proportion of benzyl alcohol which comprises agitating together substantially 73 parts water, 7½ parts sodium sulphide, 3 parts sulphur and 16½ parts benzyl chloride by weight, in the absence of any mutual solvent for the reagents, at substantially 75° to 80° C., allowing the resulting mixture to cool and the product to solidify and separating the product from the aqueous medium containing the by-product.

BRUNO H. WOJCIK.